United States Patent Office.

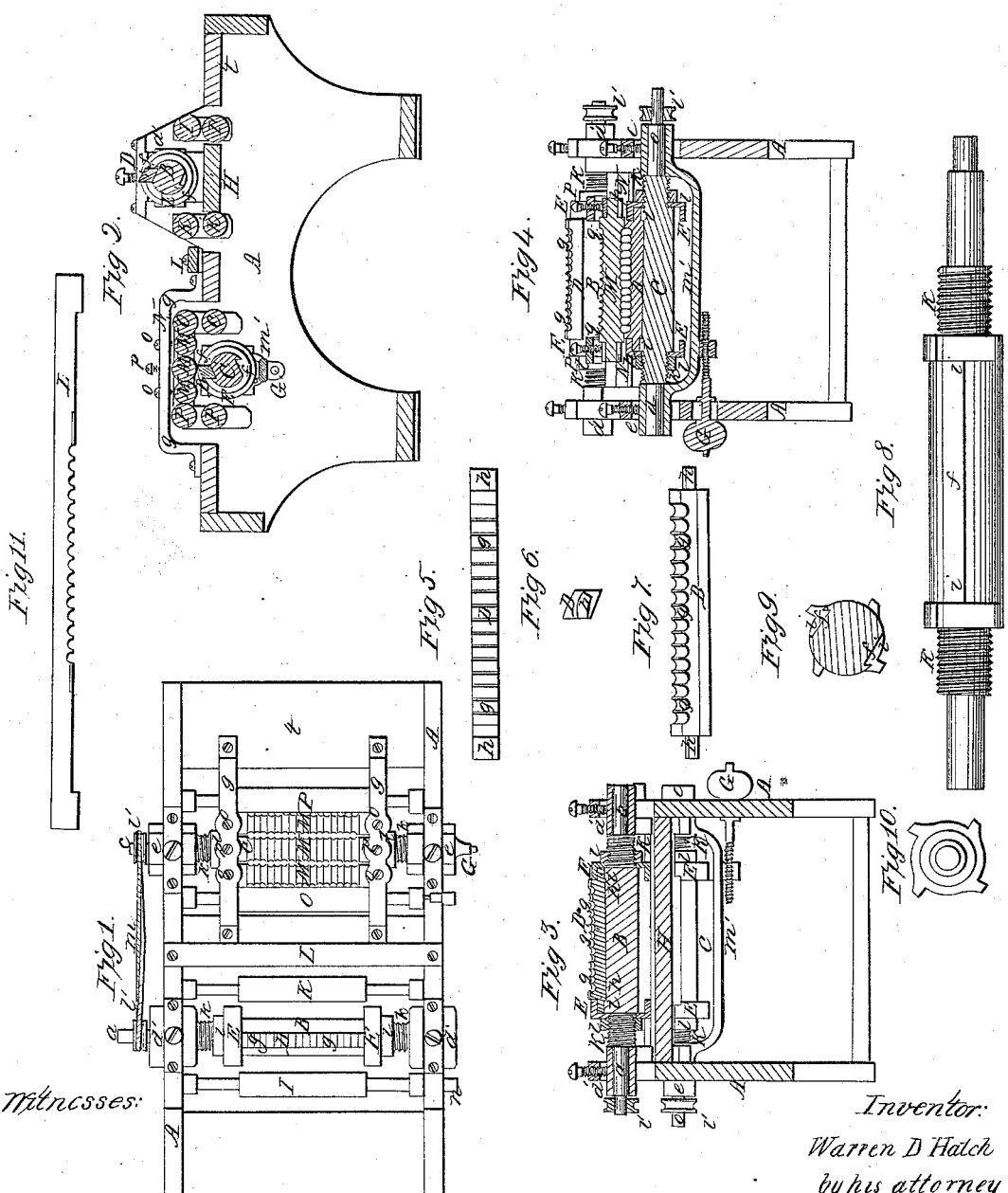

WARREN D. HATCH, OF SOUTH ANTRIM, NEW HAMPSHIRE, ASSIGNOR TO HIMSELF AND LEWIS BABBITT, OF WORCESTER, MASSACHUSETTS.

Letters Patent No. 70,208, dated October 29, 1867.

IMPROVEMENT IN PLANING MACHINES.

The Schedule referred to in these Letters Patent and making part of the same.

TO ALL PERSONS TO WHOM THESE PRESENTS SHALL COME:

Be it known that I, WARREN D. HATCH, of South Antrim, in the county of Hillsboro, and State of New Hampshire, have invented a new and useful Machine for Fluting a Board, and Reducing it to Cylinders or Prisms; and I do hereby declare the same to be fully described in the following specification, and represented in the accompanying drawings, of which—

Figure 1 is a top view, and

Figure 2 a longitudinal section of it.

Figures 3 and 4 are transverse sections of it, taken through its two rotary cutter-frames or carriers.

My invention is specially designed for the manufacture of lead-pencil woods, as well as what are termed slate-pencils. It can be used for corrugating a board on its opposite sides, so as to impart to it a serpentine form in section. It will reduce a board, or piece of board, to a series of cylinders or prisms.

In the drawings, A denotes the frame of the machine. This frame supports two rotary cutter-carriers, B C, one of which is arranged in advance of and below the other, in manner as represented. The journals $a\ b\ c\ d$ of these carriers are supported in boxes, $d'\ d'$, $e\ e$, so applied to the frame A as to be capable of being adjusted to and fixed at various elevations therein. Each of these carriers is grooved lengthwise, to receive and hold one or more grooved cutters, D, each of such cutters being made as exhibited in top, end, and side views, in figs. 5, 6, and 7.

Figure 8 is a top view,

Figure 9 a transverse section, and

Figure 10 an end view of one of the cutter-carriers, as it appears without its cutter-caps and their holding-nuts.

The longitudinal grooves of the carriers, and which serve as seats or sockets for receiving the cutters D, are shown at $f\ f$. Each of the cutters, on its external surface, is cylindrical, and is grooved transversely by a series of parallel grooves, $g\ g\ g$, each of which is semicircular or semi-prismatic in transverse section. Two ears, $h\ h$, project from opposite ends of each of the cutters, and rest against shoulders or abutments, $i\ i$, extending from the carrier. Two annular caps, E E, arranged on each of the carriers, and embracing their abutments and the ears of the cutters, in manner as represented, serve to confine the cutters to their carrier. Each carrier has two screws, $k\ k$, on which are nuts, $l\ l$, that serve, when screwed up against the caps, to hold them in place. There is a pulley, $l'$, on the shaft of each of the carriers, such being for the purpose of receiving an endless crossed band, $m$, whereby one carrier, when put in revolution, may impart rotary motion to the other. The two journal-boxes of the lower and advanced cutter-carrier C are connected by a bar, $m'$, to which and the frame A a screw, G, is so applied as to enable the two boxes, with the carrier, to be moved and adjusted, in directions transversely of the frame, as may be desirable to bring the cutters of one carrier into proper adjustment relatively to those of the other in either of such directions. Underneath the first cutter-carrier is a stationary bed or platform, H, in rear of which and the cutter-carrier is a pair of feed-rollers, I I', one of which may be set in revolution by a belt, going around a pulley, $n$, fixed on the shaft of one of such rollers; or, instead of such pulley, such rollers may be geared together, and be revolved by gearing or other proper means. Another pair of feed or guide-rollers, K K, is also arranged on the frame A, and in advance of the first cutter-carrier B, in manner as represented. This cutter-carrier, when the machine is at work, is to be put in revolution by a belt, going about a pulley on its shaft. In advance of the rollers K K', and extending across the frame of the machine, is a fluted guide or bar, L, formed as represented in edge elevation in fig. 11, the flutes thereof being arranged transversely across the bar, and parallel to each other, and corresponding in number, section, and distance apart to those of each of the cutters. Each of the flutes of the guide-bar is in the same vertical plane with one of the flutes of the cutters, and with one transverse groove of each of three guide-rollers, M M M, which are arranged over the second cutter-carrier, and are supported in adjustable boxes, N N. Each of these boxes is sustained by adjusting-screws, $o\ p\ o$, going through an arched bar, $q$, fastened on the transverse top bars of the frame A. There is a pair of plain feed-rollers or guide-rollers, O O, in rear of the series of channelled rollers M M M, and there is also another pair of such rollers, P P, arranged in advance of the said channelled rollers, the whole being as exhibited in the drawings.

A board, being laid on the part or platform *t* of the frame A, and introduced between the front set of feed-rollers, will (supposing the machine to be in operaton) be seized by them and advanced upon and along the bed H, and be subjected to the action of the cutter or cutters of the first rotary carrier. These cutters will flute it lengthwise, leaving the upper half of it in the shape of a series of semi-cylinders or prisms, each of which, as the board is drawn forward, will be forced into one of the guide-grooves of the bar L, such grooves serving to guide the board correctly between the feed-rollers O O, for it to be directed by them into the channels of the series of rollers M M M. In passing or being driven across the second or lower cutter-carrier, and its cutter or cutters, the lower half of the board will be fluted by such, so as to cause the board, on leaving the machine, to be separated into a series of cylinders or prisms, or to be corrugated in a serpentine form in cross-section.

It is manifest that one set of feeding-rollers will answer for the machine, but I prefer to have one pair of them to each of the cutter-carriers.

The form of each of the cutters is such that the reducing of it, for the purpose of sharpening it, is to be accomplished by simply grinding it on its front edge. Whatever may be the amount of such reduction, it will not affect the form which the cutter will impart to the board.

What I claim as my invention in the above-described machine is as follows, that is to say—

In a machine for reducing a board to a series of cylinders, I claim the rotary cutter-carriers B C, cutters D, in combination with the feed-rollers I I′ and K K′, fluted guide-bar L, and fluted guide-rollers O O, P P, M, all constructed, arranged, and adjusted to operate in the manner and for the purpose described.

WARREN D. HATCH.

Witnesses:
    AMOS COREY,
    EDWARD D. PUTNEY.